United States Patent
Higgins et al.

(10) Patent No.: US 12,196,857 B1
(45) Date of Patent: Jan. 14, 2025

(54) ELECTROMAGNETIC TRACKING WITH SELF LEARNING

(71) Applicant: ALKEN Inc., Colchester, VT (US)

(72) Inventors: Robert F. Higgins, South Burlington, VT (US); Henry E. Himberg, Williston, VT (US)

(73) Assignee: ALKEN Inc., Colchester, VT (US)

( * ) Notice: Subject to any disclaimer, the term of this patent is extended or adjusted under 35 U.S.C. 154(b) by 463 days.

(21) Appl. No.: 17/065,857

(22) Filed: Oct. 8, 2020

Related U.S. Application Data

(60) Provisional application No. 62/913,439, filed on Oct. 10, 2019.

(51) Int. Cl.
| | |
|---|---|
| *G01S 17/66* | (2006.01) |
| *G01S 7/48* | (2006.01) |
| *G01S 7/497* | (2006.01) |
| *G06N 20/00* | (2019.01) |

(52) U.S. Cl.
CPC ............ *G01S 17/66* (2013.01); *G01S 7/4808* (2013.01); *G01S 7/497* (2013.01); *G06N 20/00* (2019.01)

(58) Field of Classification Search
CPC ........ G01S 17/66; G01S 7/4808; G01S 7/497; G06N 20/00
See application file for complete search history.

(56) References Cited

U.S. PATENT DOCUMENTS

| | | | |
|---|---|---|---|
| 6,172,499 B1 | 1/2001 | Ashe | |
| 7,640,106 B1 | 12/2009 | Stokar et al. | |
| 8,723,509 B2 | 5/2014 | Patterson, III et al. | |
| 10,261,162 B2 | 4/2019 | Bucknor et al. | |
| 2011/0251815 A1* | 10/2011 | Bar-Tal | G01D 5/2086 600/12 |
| 2018/0120109 A1* | 5/2018 | Fite-Georgel | G06F 1/1694 |
| 2018/0351661 A1* | 12/2018 | Briggs | H04B 17/18 |
| 2019/0113966 A1 | 4/2019 | Connellan et al. | |
| 2019/0353745 A1* | 11/2019 | Zur | G01S 3/325 |
| 2020/0319361 A1* | 10/2020 | Ashe | G01V 3/087 |

FOREIGN PATENT DOCUMENTS

WO      2018102009 A1    6/2018

* cited by examiner

*Primary Examiner* — Catherine T. Rastovski
*Assistant Examiner* — Yossef Korang-Beheshti
(74) *Attorney, Agent, or Firm* — Lerner David LLP

(57) ABSTRACT

A system and method for collecting distortion compensation data to continually update and improve a distortion compensation algorithm for correcting position and orientation (PnO) information regarding an object tracked. The method may be performed while the object is freely in motion. Collection of the distortion compensation data is based on a first PnO solution based on the first PnO measurement data and irrespective of the second PnO measurement data, and a second PnO solution based on a correction algorithm that includes the first PnO measurement data, the second PnO measurement data, and PnO correction data. The first and second PnO solutions may be added to the PnO correction data to continually update and improve the distortion compensation algorithm.

20 Claims, 2 Drawing Sheets

ELECTROMAGNETIC TRACKING WITH SELF LEARNING

CROSS-REFERENCE TO RELATED APPLICATIONS

The present application claims the benefit of the filing date of U.S. Provisional Patent Application No. 62/913,439 filed Oct. 10, 2019, the disclosure of which is hereby incorporated herein by reference.

TECHNICAL FIELD

The present disclosure generally relates to electromagnetic tracking systems, and particularly to hybrid electromagnetic tracking systems.

BACKGROUND

Electromagnetic tracking systems use electromagnetic field emitters and sensors to track the position and/or orientation (PnO) of an object as the object moves through an environment within which the tracked object is expected to move. The system determines the PnO of the sensors relative to the emitters based on characteristics of the magnetic field from the emitters impinging on the sensors. Electromagnetic tracking systems provide a high level of performance in terms of accuracy, precision and update rate, but their accuracy is reduced when nearby ferrous or conductive materials distort the magnetic field. For example, if a distortive element is present in an area close to an emitter or receiver, or at some location between an emitter-receiver pair, then eddy currents generated by the distortive element can cause errors to manifest in the sensor data collected by the tracking system.

Field distortion in PnO measurements can be compensated for by mapping the environment of the tracked object. TYpically, the mapping is performed in advance using a calibration system which places the tracked object within the environment at known locations and orientations while recording calibration data such as the PnO indicated by the electromagnetic tracking system at each known location, or other equivalent information. The known locations and orientations are typically controlled using fixed mechanical structures that precisely measure the location of the sensors relative to the emitter. Later, when the electromagnetic tracking system is put into operation and the tracked object moves freely to an unknown PnO, the system measures the PnO using the sensors and emitters, adjusts the measured PnO based on the calibration data, and reports the adjusted PnO to the user as an estimate of the position and orientation of the tracked object.

The calibration system may be reliable for environments that do not change over time. However, if ferrous or conductive objects are introduced into or removed from the environment, the magnetic distortion can change, reducing the accuracy and reliability of the calibration data and thus reduce the accuracy and reliability of the adjusted PnO estimated by the system and reported to the user. For example, where an electromagnetic tracking system is used to track the PnO of a pilot's helmet in an airplane cockpit, a metal object such as a metal clipboard carried by the pilot may affect the tracking accuracy. Ferrous or conductive objects can potentially be introduced into or removed from the environment frequently, and it would be impractical to repeat the calibration process and generate a new mapping of the environment every time such a change occurs. Moreover, a change in the magnetic distortion environment may be undetected by the user, so that it is not even known that the calibration process needs to be performed again.

SUMMARY

One aspect of the disclosure provides an electromagnetic tracking system and distortion correction process using calibration data, other distortion correction data, or a combination thereof, that can be continually updated while the electromagnetic system and the tracked object are in use, that is, while the tracked object is freely moving throughout the environment to an unknown PnO. In effect, the system is capable of learning its magnetic distortion environment while in service, and compensates for any changes introduced to the learned magnetic distortion environment during service.

The system includes a magnetic tracking subsystem and a nonmagnetic tracking subsystem. The subsystems may be independently capable of collecting data indicative of the PnO of a tracked object, referred to herein as "PnO measurement data," and may independently or collectively determine the PnO of the object, referred to herein as a "PnO solution," from the collected measurement data. As the tracked object moves freely around the environment to unknown PnOs, the system derives a PnO solution based on the PnO measurement data from the magnetic tracking subsystem alone, and another PnO solution that is a best estimate of the object's PnO based on data from the magnetic subsystem, the nonmagnetic subsystem, or a combination thereof. In some instances, the best estimate of PnO may be the unadjusted PnO solution of the PnO measurement data from the magnetic tracking subsystem alone. In other instances, the best estimate of PnO may be an adjusted PnO solution using correction data previously stored in the system to adjust the PnO measurement data from the magnetic tracking subsystem, using PnO measurement data from the nonmagnetic tracking subsystem to adjust or otherwise correct the PnO measurement data from the magnetic tracking subsystem, or both. The correction data stored in the system may account for magnetic distortions in the tracked environment that are previously known to the system. Additionally, to the extent that the PnO measurement data from the nonmagnetic tracking subsystem is different from the PnO measurement data from the magnetic tracking subsystem, the nonmagnetic tracking subsystem may indicate magnetic distortions in the tracked environment, whether or not they are previously known.

The system also updates the correction data based on the PnO solutions, which are the unadjusted magnetic PnO solution and the best estimate of PnO. The updates to the correction data can effectively teach the correction data to compensate for newly introduced magnetic distortions in the tracked environment that were not previously known, as well as to compensate for previously existing distortions in the environment that have moved or have been removed. The updated correction data can then be used to more accurately and reliably adjust PnO measurement data collected in the future from the magnetic tracking subsystem, since the updated correction data will reflect a more up-to-date indication of the distortion environment. PnO measurement data may be continually collected, PnO solutions may be continually derived from the measurement data, and the correction data can be updated according to the derived PnO solutions as necessary. Thus, the correction data may be updated, and the changes to the distortion environment may be tracked, as often as necessary. Further, the updates to the correction data and tracked changes to the distortion environment can occur even while the system is in service, and without requiring the user's knowledge of those changes.

In some example embodiments, the system may determine a level of confidence for the best estimate of PnO and update the correction data only if the level of confidence meets or exceeds a threshold value. Otherwise, if the best estimate of PnO is below the threshold value, the correction data may be left in its previous state. This may ensure that the correction data is updated using only reliable PnO solutions that accurately reflect the up-to-date distortion environment, and is not changed by unreliable PnO solutions that may potentially change the distortion compensation inaccurately.

Another aspect of the disclosure is directed to method for tracking a PnO of a first object within an environment according to a frame of reference defined by a second object, including repeatedly deriving, by one or more processors, a measured PnO solution of the first object according to the frame of reference defined by the second object from first PnO measurement data received from a magnetic tracking subsystem, deriving, by the one or more processors, an estimated PnO solution of the first object according to the frame of reference defined by the second object from a combination of adjusted first PnO measurement data and second PnO measurement data received from a non-magnetic tracking subsystem, the adjusted first PnO measurement data being adjusted according to a correction algorithm that accounts for previously detected electromagnetic distortion within the environment based on previously stored correction data, and updating, by the one or more processors, the previously stored correction data based on the measured PnO solution and the estimated PnO solution.

In some examples, the method may further include, for each derived estimated PnO solution, logging the estimated PnO solution in a log or outputting the estimated PnO solution to a user.

In some examples, the method may be repeatedly performed while the first object is in use.

In some examples, the method may be repeatedly performed while the first object is freely moving about the environment.

In some examples, deriving the measured and estimated PnO solutions may involve emitting, by a plurality of transmission coils of the magnetic tracking subsystem, magnetic fields along different respective axes of the transmission coils, sensing, by a plurality of sensing elements of the magnetic tracking subsystem, the emitted magnetic fields of each transmission coil along different respective axes of the sensing elements, receiving, by the one or more processors, first electrical signals indicative of the sensed magnetic fields, and determining, by the one or more processors, first PnO measurement data from the first electrical signals.

In some examples, the method may further include determining, by the one or more processors, a level of confidence in the estimated PnO solution. Updating the previously stored correction data may be performed in response to the level of confidence in the estimated PnO solution meeting or exceeding a threshold confidence value.

In some examples, determining the level of confidence may involve determining, by the one or more processors, a respective quality factor for each of the magnetic tracking subsystem and the non-magnetic tracking subsystem, and the level of confidence may be determined based on a combination of the respective quality factors.

In some examples, determining the level of confidence may further involve, in response to determining the magnetic tracking subsystem meeting to be reliable and the non-magnetic tracking subsystem to be unreliable based on the respective quality factors, adjusting, by the one or more processors, the second PnO measurement data to correct an error in the second PnO measurement data.

In some examples, the level of confidence may be based at least in part on a change in the estimated PnO solution, or a change to the correction data, over time.

In some examples, the method may further include a calibration phase performed prior to the method, wherein during the calibration phase, deriving first and second PnO solutions, and updating the correction data, are performed while a PnO of the first object relative to the second object is controlled by a fixed mechanical structure. The correction data may be based at least partially on first and second PnO solutions derived during the calibration phase.

In some examples, the correction data may include both (i) first and second PnO solutions determined during the calibration phase and (ii) first and second PnO solutions determined while the first object is freely moving about the environment.

In some examples, the method may be performed as one or more elements creating electromagnetic distortion within the environment is introduced or removed from the environment.

Yet a further aspect of the disclosure is directed to a system for tracking a freely moving first object relative to a second object, including a magnetic tracking subsystem including a first set of active elements including a plurality of transmission coils having different axes and a second set of active elements including a plurality of sensing elements operative to detect magnetic fields emitted by the plurality of transmission coils along different axes and to generate corresponding electrical signals for each component of the magnetic field, a non-magnetic tracking subsystem including at least one tracking element having a known position and orientation relative to at least one of the plurality of transmission coils or the plurality of sensing elements, and one or more processors configured to derive first position and orientation (PnO) measurement data from the electrical signals received from the plurality of sensing elements of the magnetic tracking subsystem, derive second PnO measurement data from the non-magnetic tracking subsystem, determine a first PnO solution of the freely moving first object relative to the second object based on the first PnO measurement data and irrespective of the second PnO measurement data, determine a second PnO solution of the first object relative to the second based on (i) the first PnO measurement data adjusted according to correction data applied by a correction algorithm and (ii) the second PnO measurement data, and update the correction data based on the derived first and second PnO solutions.

In some examples, the system may further include a memory, the correction data may be stored in the memory, and the one or more processors may be configured to access the correction data from the memory, and adjust the first PnO measurement data according to the accessed correction data.

In some examples, the one or more processors may be configured to repeatedly derive first and second PnO measurement data, determine first and second PnO solutions, and update the correction data while the system is in service.

In some examples, the one or more processors may be further configured to determine a level of confidence of the second PnO solution, update the correction data in response to the determined level of confidence meeting or exceeding a threshold confidence value, and avoid updating the correction data in response to the determined level of confidence not meeting or exceeding the threshold confidence value.

In some examples, the one or more processors may be further configured to determine a respective quality factor for each of the magnetic tracking subsystem and the non-magnetic tracking subsystem. The level of confidence may be based on a combination of the respective quality factors.

In some examples, the level of confidence may be based at least in part on a change in the second PnO solution, or a change to the correction data, over time.

In some examples, the at least one tracking element of the non-magnetic tracking subsystem may be an inertial sensor, an optical transmitter or sensor, an acoustic transmitter or sensor, a radio frequency (RF) transmitter or sensor, a global positioning system (GPS) receiver, or a radar chip.

In some examples, at least one active element of the non-magnetic tracking subsystem may be mechanically coupled to the transmission coils or the sensing elements of the magnetic tracking subsystem.

In some examples, the correction data may be indicative of previously detected electromagnetic distortions, and wherein correction algorithm corrects the first PnO solution to counteract errors manifested by the previously detected electromagnetic distortions.

DETAILED DESCRIPTION

Example Systems

Figure 1:
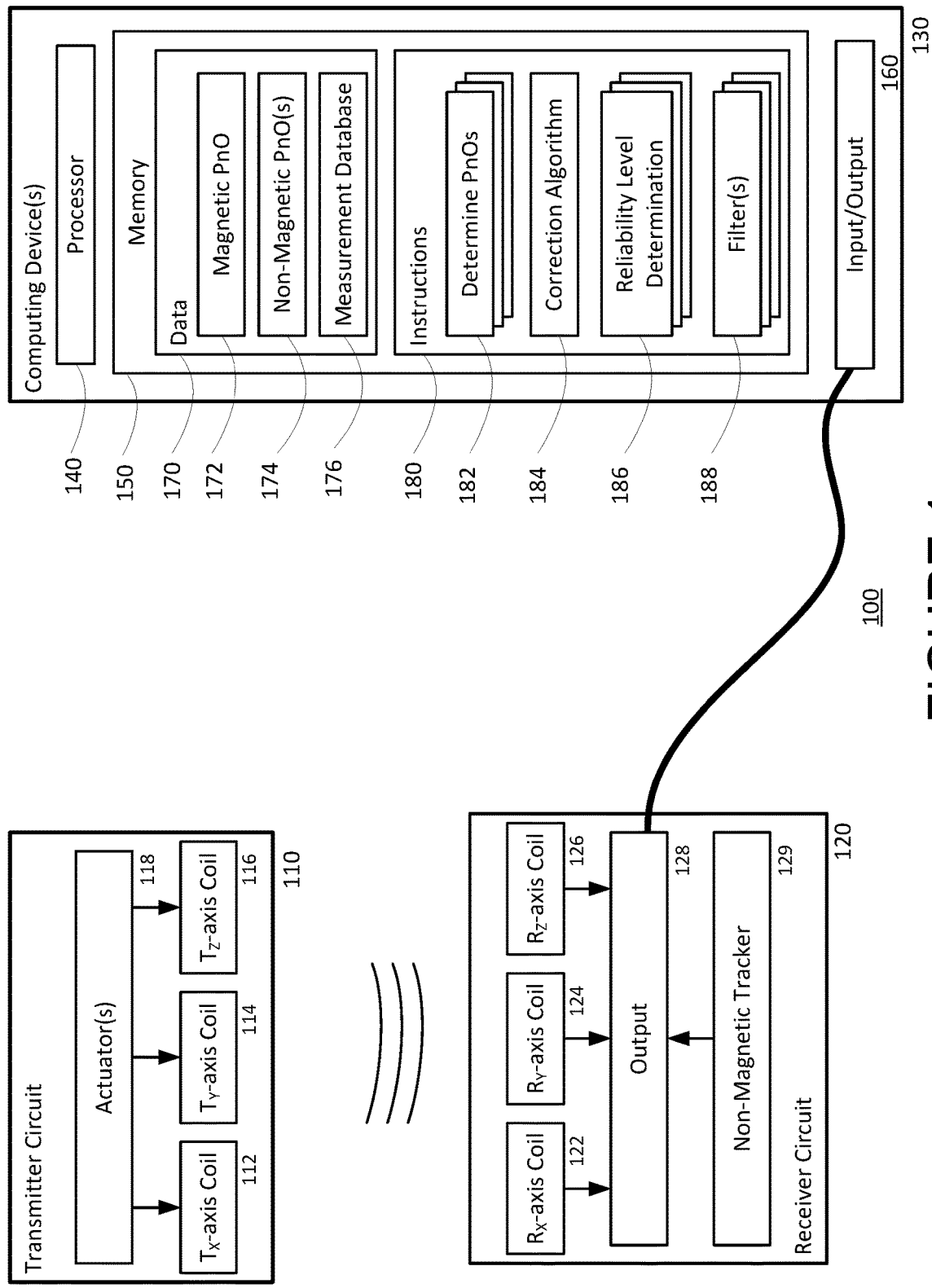
FIG. 1 is a block diagram of an electromagnetic tracking system in accordance with an embodiment of the present disclosure.

FIG. 1 is a block diagram illustrating a hybrid tracking system 100 for tracking the position and orientation of a first object 101 that is freely movable relative to a second object 103. The system 100 includes each of a magnetic tracking subsystem and a non-magnetic tracking subsystem. Each subsystem may be independently capable of tracking a position and/or orientation (PnO) of the first object 101. The PnO of the first object may be characterized in terms of a frame of reference defined by the second object 103. Thus, the PnO of the first object 101 is tracked relative to the second object 103.

The magnetic tracking subsystem includes a transmitter circuit 110 for generating an electromagnetic field, and a receiver circuit 120 for sensing the generated electromagnetic field and generating electrical signals based on the sensed electromagnetic field.

In the example of FIG. 1, the transmitter circuit 110 includes a transmitter coil array having a plurality of transmitter coils 112, 114, 116 physically mounted to a second object 103. The transmitter coils are aligned along axes of the transmitter, respectively. In FIG. 1, these axes are denoted $T_X$, $T_Y$ and $T_Z$. The $T_X$, $T_Y$ and $T_Z$ axes may be orthogonal to one another, or they may be different from one another without being orthogonal. Generally, the axes do not all extend within a common plane so that the axes form a three-dimensional frame of reference or coordinate system.

The transmitter circuit 110 may further include an actuating circuit 118 configured to actuate the transmit coils at different times or different frequencies. The actuating circuit 118 may include one or more frequency generators for generating one or more alternating signals. A different frequency signal may be provided to a respective driver for driving each coil, respectively. Alternatively, the same alternating signal may be input to a multiplexer which is timed by a clock included in the transmitter, and outputs of the multiplexer may be provided to the respective drivers at different times. The drivers may further include additional components for driving the coils, such as one or more amplifier circuits. The alternating signal applied to each coil causes the coil to produce an electromagnetic field. Because the driving signals differ from one another in frequency, timing, or both, the fields produced by the various coils also differ from one another.

In the example of FIG. 1, the receiver circuit 120 includes a receiver coil array having a plurality of receiver coils 122, 124, 126 mounted to a first object 101 aligned along axes of the receiver circuit, respectively. In FIG. 1, these axes are denoted $R_X$, $R_Y$ and $R_Z$. The $R_X$, $R_Y$ and $R_Z$ axed are fixed relative to the first object 101. As with the transmitter axes, the receiver axes may be orthogonal to one another, or may be different from one another without being orthogonal, but generally form a three-dimensional coordinate system (e.g., do not all extend within a common plane).

Since the receiver coils can be oriented independent of the transmitter coils, it should be understood that the $R_X$, $R_Y$ and $R_Z$ axes of the receiver coil typically are not aligned with the $T_X$, $T_Y$, $T_Z$ axes of the transmitter circuit. Thus, the PnO determined by the magnetic tracking subsystem may be characterized in terms of a position and an orientation of the axes of the receiver circuit relative to the axes of the transmitter coils. In this regard, the movement in position or orientation of one or more transmitter coils relative to the receiver coils, or one or more receiver coils relative to the transmitter coils, will influence the PnO solution derived by the system. As such, the transmitter coils and receiver coils are referred to herein as "active elements," whereby the transmitter coils 112, 114 and 116 form one set of active elements of the magnetic locating system, and the receiver coils 122, 124 and 126 form another set of active elements of the magnetic locating system.

The electromagnetic fields generated by the transmitter circuit 110 cause alternating electric current to be generated in the windings of the receiver coils 122, 124, 126. The alternating electric current in each receiver coil typically includes multiple components. Each component is caused by the field generated by one of the transmitter coils. Because the fields generated by the transmitter coils differ from one another in timing, frequency or both, the components of the current in each receiver coil also differ from one another. The system includes conventional elements (not shown) for separating the components of the current in each. The components of the current in coil 122 include a component referred to as $T_X R_X$, representing the current in $R_X$ receiver coil 122 resulting from the field generated by $T_X$ transmitter coil 112; another component $T_Y R_X$ representing the current in $R_X$ receiver coil 122 resulting from the field generated by TY transmitter coil 114, and a further component $T_Z R_X$ representing the current in $R_X$ receiver coil 122 resulting from the field generated by $T_Z$ transmitter coil 116. Similarly, the components of the current in $R_Y$ receiver coil 124 include components $T_X R_Y$, $T_Y R_Y$ and $T_Z R_Y$, and the components of the current in $R_Z$ receiver coil 126 include components $T_X R_Z$, $T_Y R_Z$ and $T_Z R_Z$.

In the case of a time-division based transmission, the timing of the electric currents may indicate which of the transmitter coils 112, 114, 116 generated the electromagnetic fields that resulted in the electric current. The system may include a conventional separation circuit synchronized to the timing of the transmitter circuit to separate the components according to the time they are received. In the case of a frequency-division based transmission, the separation circuit may include analog or digital frequency-selective filters. The separation circuit may be provided as part of the receiver circuit 120, or may be included in one or more computing devices 130 discussed herein.

The non-magnetic tracking subsystem is depicted in FIG. 1 in the form of block 129. Block 129 is a non-magnetic active element, whereby a change in position or orientation of block 129 will influence a PnO solution derived by the system based on the non-magnetic tracking subsystem.

In the example of FIG. 1, the non-magnetic tracking subsystem is a conventional inertial locating system, and block 129 represents a set of active elements including linear acceleration sensors and gyroscopic sensors (not shown). These active elements are fixed to the tracked first object 101 in known position and orientation relationship to the active elements of the magnetic tracking system which are mounted on the tracked object, which in the example of FIG. 1 are the receiver coils 122, 124, 126. Preferably, the active elements 129 of the nonmagnetic tracking system are co-located with the receiver coils, so that the linear accelerometers measure acceleration along axes $R_X$, $R_Y$ and $R_Z$, and the gyroscopic sensors measure rotational acceleration around these axes. The inertial locating system may include another set of similar active elements for monitoring movement of the second object 103, which may or may not be a moving frame of reference (as, for example, if the second object 103 is mounted in a vehicle that may or may not be in motion). In the conventional manner, the inertial locating system integrates rotational accelerations to track orientation and integrates linear accelerations to track position. Desirably, the non-magnetic tracking system derives PnO solutions in the same frame of reference as the magnetic tracking system, or in a frame of reference having fixed position and orientation relative to the frame of reference used by the magnetic tracking system.

In further embodiments, the non-magnetic tracking subsystem may include any one or combination of gyroscopes, accelerometers, barometers, optical sensors and transmitters, acoustic sensors and transmitters, radio frequency (RF) sensors and transmitters, global positioning system (GPS) receivers, radar chips, and others. For purposes of the present disclosure, the "non-magnetic tracker" may additionally or alternatively include magnet-based sensors that do not rely on an electromagnetic transmitter circuit for its sensor readings and that are not sensitive to local electromagnetic distortions within the tracking environment, such as a magnetometer for sensing a magnetic field polarity (such as a magnetic field of the Earth). Each of the active elements of the non-magnetic tracking subsystem may be capable of tracking a movement of the tracked object, in terms of position, orientation, or a combination thereof. Movement of the tracked object may be determined by the non-magnetic active elements independent of the determinations by the active elements of the electromagnetic tracking system.

Each of the transmitter circuit 110 and the receiver circuit 120 may be connected to one or more computing devices included in the system electronics in order to transmit and receive data with the computing devices. For example, in FIG. 1, the receiver circuit 120 includes an output circuit 128 for receiving the generated electric currents and providing the currents as electrical signals to one or more computing devices 130. The output to the computing devices 130 may be an analog or digital signal, depending on the available hardware and software included in each of the output circuit 128 and the computing devices 130. The non-magnetic active elements 129 are also connected to the one or more computing devices 130 included in the system electronics in order to transmit and receive data with the computing devices 130. The one or more computing devices 130 are configured to receive and process the electrical signals generated by active elements included in or mounted to the first object 101, which includes the receiver circuit 120 and non-magnetic active element represented by block 129. In the example of FIG. 1, the connection between the magnetic and non-magnetic active elements and the one or more computing devices 130 is shown as a wired connection using a cable, such as a USB TYpe-C cable. Other cables typically used in electromagnetic tracking systems, or wireless connections, including short range communication protocols such as near-field communication (NFC), WiFi, Bluetooth, Bluetooth LE, may be used. Additionally or alternatively, the transmitter circuit and the receiver circuit may be connected to one another in a wired or wireless manner in order to provide information therebetween, such as providing phase information from the transmitter to the receiver to avoid phase ambiguity of the electromagnetic field generated by the transmitter.

The magnetic and non-magnetic subsystems may be configured to ensure that data collected at the same time by the respective systems is compared to one another at the one or more computing devices 130. This may involve wiring the magnetic and non-magnetic subsystems together to synchronize data collection and transmission, providing time signatures with the collected data, or some combination thereof.

The one or more computing devices 130 of the system electronics may include a processor 140, memory 150, and other components typically present in general purpose computers. The computing devices 130 may further include one or more input/output connections 160 for sending and receiving data from the transmitter circuit, receiver circuit, non-magnetic tracker, or any combination thereof.

The processor 140 may be a well-known processor or other lesser-known types of processors. Alternatively, the processor 140 can be a dedicated controller such as an ASIC. The memory 150 can store information accessible by the processor 140, including data 170 that can be retrieved, manipulated or stored by the processor 140, in accordance with instructions 180 stored in the memory. The memory 150 may be a type of non-transitory computer readable medium capable of storing information accessible by the processor 140, such as a hard-drive, solid state drive, tape drive, optical storage, memory card, ROM, RAM, DVD, CD-ROM, write-capable, and read-only memories.

Although the system described herein is not limited by a particular data structure, the data 170 may be stored in computer registers, in a data store as a structure having a plurality of different fields and records, or documents, or buffers. The data 170 may also be formatted in a computer-readable format such as, but not limited to, binary values, ASCII or Unicode. Moreover, the data 170 can include information sufficient to identify relevant information, such as numbers, descriptive text, proprietary codes, pointers, references to data stored in other memories, including other network locations, or information that is used by a function to calculate relevant data. The instructions 180 may be a set of instructions executed directly, such as machine code, or indirectly, such as scripts, by the processor 140. In this regard, the terms "instructions," "steps," "programs" and "routines" can be used interchangeably herein. The instructions 180 can be stored in object code format for direct processing by the processor 140, or other types of computer language including scripts or collections of independent source code modules that are interpreted on demand or compiled in advance.

Although FIG. 1 functionally illustrates the processor 140 and memory 150 as being within the same computing device block 130, the processor 140 and memory 150 may actually include multiple processors and memories that may or may not be stored within the same physical housing. For example, some of the data 170 and instructions 180 may be stored on a removable CD-ROM and others within a read-only computer chip. Some or all of the instructions and data can be stored in a location physically remote from, yet still accessible by, the processor 140. Similarly, the processor 140 can actually include a collection of processors, which may or may not operate in parallel.

In the example of FIG. 1, the data 170 may include a magnetic PnO data 172, which is information for determining a position and orientation (PnO) of the receiver circuit 120 relative to the transmitter circuit 110, or vice versa, according to the magnetic tracking subsystem. Given that the receiver circuit 120 is affixed to the tracked first object 130, the magnetic PnO data 172 may by extension indicate PnO of the first object 101 relative to the transmitter circuit 110 and, by extension, the second object 103.

The magnetic PnO data 172 may include a signal matrix from which the PnO of the tracked object may be determined. The matrix may have an M x N structure, M, being the number of coils in the transmitter circuit, and N being the number of coils in the receiver circuit. Each component of the matrix may correspond to the electrical signal of a different transmitter coil-receiver coil pairing. The values included in the matrix may be representations of the raw magnetic field data sensed by the receiver coils 122, 124, 126, including a magnitude and polarity of the magnetic field sensed from each one of the transmitter coils 112, 114, 116 of the transmitter circuit 110.

In the example of FIG. 1, in which three transmitter coils generate an electromagnetic field sensed by three receiver coils, the matrix may be a 3×3 matrix, whereby each component of the matrix may correspond to a different transmitter coil-receiver coil pair. Table 1 shows an example matrix:

TABLE 1

| $T_X R_X$ | $T_X R_Y$ | $T_X R_Z$ |
| $T_Y R_X$ | $T_Y R_Y$ | $T_Y R_Z$ |
| $T_Z R_X$ | $T_Z R_Y$ | $T_Z R_Z$ | whereby "$T_X R_X$" denotes a component of the electromagnetic field generated by the $T_X$ transmitter coil 112 and sensed by the $R_X$ receiver coil 122, and so on as discussed above. In other example configurations, M transmitter coils may be used, and N receiver coils may be used, whereby N is a value of two or more and may or may not be equal to three. In such configurations, an M×N matrix may be included in the PnO data. It should be recognized that if M×N<6, then it may not be possible to solve for six variables using only the matrix, such that six degrees of freedom (such as three axes of position and three axes of orientation) of the receiver circuit may not be determined based only on the matrix. In such instances, additional sensor information may be required to provide a complete PnO determination.

The data 170 may also include non-magnetic PnO data 174, which is information for determining PnO of the tracked object according to the non-magnetic tracking subsystem. The non-magnetic tracking subsystem may derive its own non-magnetic PnO data 174 independent of the magnetic tracking subsystem. Additionally, different components of the non-magnetic tracking subsystem may derive PnO of the object independent of one another. For example, the non-magnetic tracking subsystem may include an optical sensor configured to track changes in the position of the tracked object independent of other sensors, and may further include one or more gyroscope configured to track changes in the orientation of the tracked object independent of the other sensors.

The data 170 may further include a database for storing correction data 176. The correction data 176 stored in the database may characterize the distortions present in the tracked environment of the system, and may be used to adjust PnO solutions derived from the magnetic PnO data 172 based on the known distortions in the environment. The correction data 176 itself may be derived from PnO solutions generated by a combination of the magnetic tracking subsystem and the non-magnetic tracking subsystem over time. Stated another way, the correction data 176 may be iteratively derived and updated over time using the magnetic PnO data 172 and non-magnetic PnO data 174 that is continually collected by the magnetic and non-magnetic tracking subsystems, respectively. Additionally, and as described in greater detail herein, the correction data 176 may further factor in data collected prior to the system being in service, which is referred to herein as "calibration data."

The instructions 180 included in the memory 150 of the one or more computing devices 130 may include instructions for processing the data from the tracking subsystems to determine a PnO of the first object 101 and further to improve future PnO determinations. For example, the instructions 180 may include one or more PnO determination routines 182 for determining PnO solutions of the tracked first object 101 from magnetic and non-magnetic tracking subsystem PnO data 172, 174. In the case of the magnetic PnO data 172, the PnO determination routines 182 may include instructions for separating the electrical signals into their respective components and constructing the matrices with these components. For PnO solutions involving the non-magnetic PnO data 174, either alone or in combination with magnetic PnO data 172, the PnO determination routines 182 may include other instructions for processing the available sensor data to derive the PnO solutions.

The instructions may further include one or more correction algorithms 184 used to adjust the magnetic PnO data 172 in order to account for and compensate for known distortions in the tracked environment according to the correction data 176 stored in the database. The correction algorithms 184 may manipulate the PnO solution derived from the magnetic PnO data 172 in order to compensate for the known distortions characterized by the correction data 176, whereby a more accurate PnO measurement of the tracked first object 101—and not a distorted measurement—may be achieved. The correction algorithm 184 may be any distortion correction algorithm known in the art. The distortion correction algorithm 184 is typically stored in the form of one or more polynomial expressions, a lookup table, or any combination thereof, and applies one or more vectors or rotations to the measured data.

The instructions 180 may further include instructions for a level of confidence determination routine 186 for determining reliability of PnO solutions determined by the PnO determination routines 182. In some instances, the level of confidence routine 186 may be based on changes in the determined PnO solutions over time, whereby gradual changes in small increments over time may be indicative of a high reliability, and large abrupt changes may be indicative of low reliability. In such instances, a level of confidence in the PnO solutions may be quantified based on the magnitude of the changes over time. Additionally or alternatively, the level of confidence determination routine 186 may be based on evaluations of respective quality factors for the magnetic and non-magnetic tracking subsystems of the system. Quality factors may vary for each type of tracking device or each subsystem depending on certain factors such as distance to the tracked objection, presence of noise, vibrations, distorting materials, sensor drift. In such instances, and depending on the various factors in play, the level of confidence determination routine 186 may be based on one or a combination of motion models, noise measurements, vibration measurements, rate of change measurements, time measurements, and the like. Quality factor determination is described in greater detail in commonly owned U.S. patent application Ser. No. 16/773,482, the disclosure of which is incorporated herein in its entirety by reference.

For PnO solutions derived from a combination of magnetic and non-magnetic PnO data 172, 174, the instructions 180 may further include one or more filtering routines 188 or filters for combining the PnO data 172, 174. The filters may be configured to take the PnO data 172, 174 as input and derive a combined PnO solution from the inputs. As described herein, the combined PnO solution may serve as a best estimate of the PnO of the tracked first object 101. In operation, the filters 188 may be designed to use weighting when combining the PnO data 172, 174 based on properties of the filtered data, such as noise, magnetic distortion, rate of change (such as a change in velocity) or other measurable quantities). Additionally or alternatively, the filters 188 may rely on motion models and error covariance to evaluate the received data from the various sensor sources and to identify patterns in the data that may indicate the presence of errors for one or a combination of sensor sources, an absence of errors for one or a combination of sensors sources, or both. Example filter arrangements are described in greater detail in commonly owned U.S. patent application Ser. No. 16/773,482, the disclosure of which is incorporated herein in its entirety by reference.

The one or more computing devices 130 in FIG. 1 are shown as a single block, although it should be appreciated that the computing device components may be included within multiple computing components. For example, the processor 140 may include multiple processors included in different computing devices and communicatively connected by one or more wired or wireless connections. Additionally or alternatively, data or instructions of the memory may be stored in different computing devices and communicatively connected by one or more wired or wireless connections. For instance, the database may be stored separately, such as in a secure distributed network, and accessed by a client computing device on which the correction algorithm 184 is stored in order for the correction algorithm to be updated and modified. For further instance, updates and modifications to the correction algorithm may be performed at the distributed network and subsequently transmitted to the client computing device in order to improve processing speeds and avoid processing costs and time at local computing devices.

Example Methods

Figure 2:
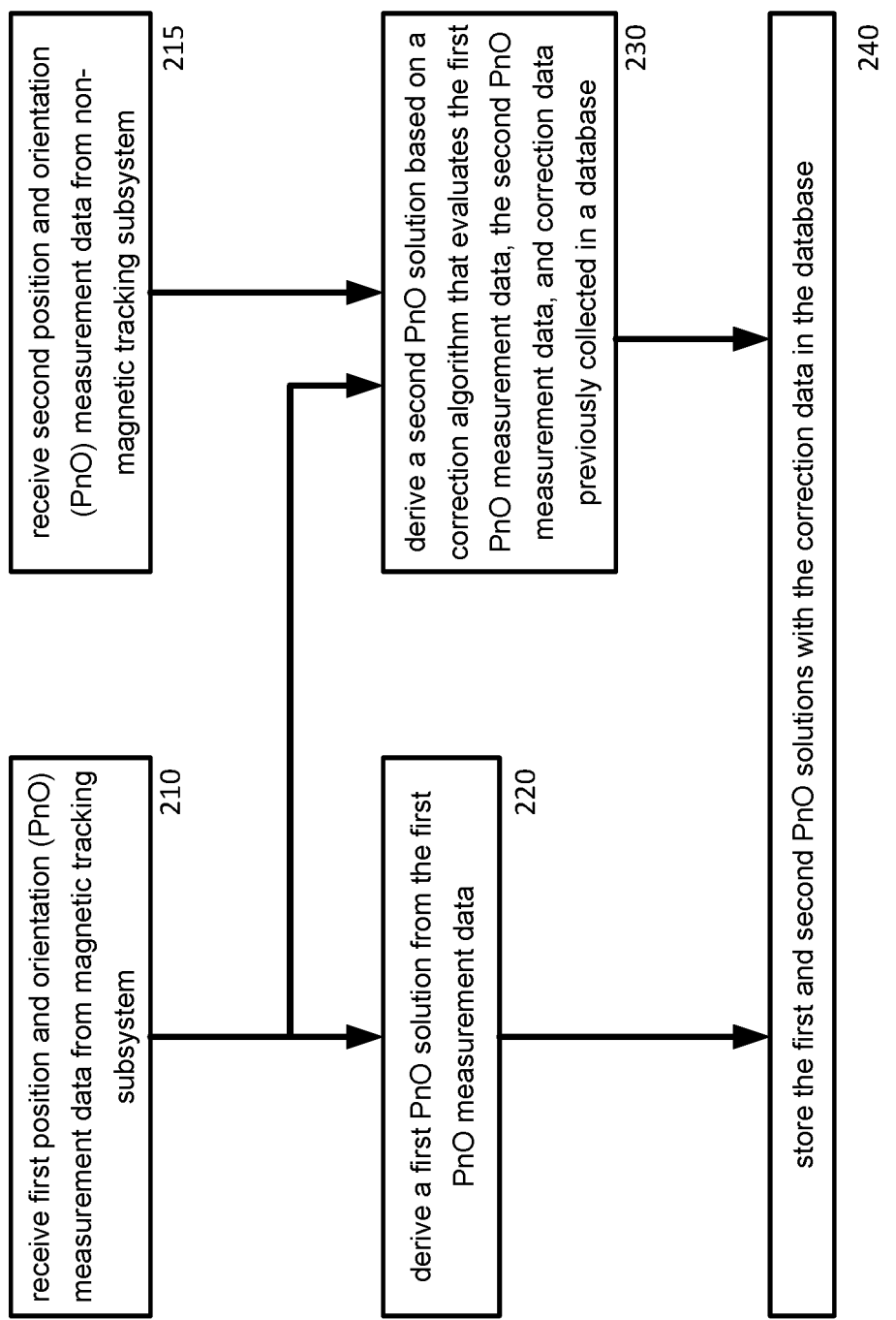
FIG. 2 is a flow diagram of an example routine in accordance with an embodiment of the present disclosure.

FIG. 2 is a flow diagram showing an example routine 200 for tracking a PnO of a freely moving tracked object. The routine relies on an updatable correction algorithm to compensate for known electromagnetic distortions in the tracking environment, whereby the updatable correction algorithm can be updated while the object remains in service, moving freely to unknown positions and orientations. The correction algorithm is further updatable according to data gathered from both magnetic and non-magnetic tracking subsystems in order to increase reliability and accuracy of the routine. It should be understood that the routine 200 shown in FIG. 2 is a single iteration of a longer tracking process that may be carried out repeatedly, whereby new PnOs of the object-in-motion are constantly being gathered and may be reported to a user of the system, and further whereby updates to the correction algorithm are constantly being determined and implemented to provide constant or even real-time monitoring of electromagnetic distortions in the tracking environment. As such, the steps of the routine 200 may be cycled through for as long as the system remains in service.

At least some of the operations in the routine 200 may be carried out by the one or more computing devices of the system shown in FIG. 1. It should be understood that in other example routines, steps may be added, subtracted, replaced, reordered, or performed at about the same time or in parallel.

At block 210, first PnO measurement data may be received from the magnetic tracking subsystem. The first PnO measurement data may include a first plurality of electrical signals received from the receiver circuit, corresponding to the respective components of the portion of the magnetic field detected by the receiver circuit that was generated by the coil array of the transmitter circuit. Each electrical signal may have a magnitude, frequency and phase, and may correspond to a component of the magnetic field generated by a particular transmitter coil of the transmitter circuit and detected by a particular receiver coil of the receiver circuit. As described herein, a matrix may be constructed from the received electrical signals corresponding to the detected magnetic field generated by the transmitter circuit.

At block 215, second PnO measurement data may be received from the non-magnetic tracking subsystem. The first PnO measurement data may include a one or more second electrical signals generated by and received from the non-magnetic tracking device or devices of the system, such as an IMU, accelerometers, gyroscopes, optical sensors, and so on. In some instances, the second electrical signals may be associated with respective directional or angular axes of the tracked environment and may have a magnitude indicative of motion along the respective axes, whereby motion of the tracked object may be determined from the second electrical signals.

At block 220, a first PnO solution may be derived from the first PnO measurement data. The first PnO solution indicates a "measured PnO," which is measured according to the magnetic tracking subsystem, irrespective of the second PnO measurement data received from the non-magnetic tracking subsystem. The first PnO solution may also be measured irrespective of the correction algorithm, such that the first PnO solution does not account for the known distortions in the tracked environment.

At block 230, a second PnO solution may be derived according to one or a combination of the first PnO measurement data and the second PnO measurement data. The second PnO indicates an "estimated PnO," which is a best estimate of the actual PnO of the tracked object based on the first and second PnO measurement data. The best estimate may adjust the first PnO measurement data according to the correction algorithm, such that the second PnO solution accounts for the previously known distortions in the tracked environment. Additionally the best estimate may further adjust, or even replace, the first PnO measurement data with the second PnO measurement data. For instance first and second PnO measurement data may be combined using one or more of the filters 188 described in connection with FIG. 1. Techniques for adjusting or replacing a first PnO solution based on second PnO measurement data are further described in commonly owned U.S. patent application Ser. No. 16/773,482, the disclosure of which is incorporated herein in its entirety by reference. Adjustments to the first PnO measurement data by the correction algorithm may be applied before combining the first and second PnO measurement data, in order for the measurement data to be accurately combined.

At block 240, the first and second PnO solutions are used to update the correction data in the database, such as correction data 176 of the example system of FIG. 1. Updating the correction data may involve storing each of the first and second PnO solutions. For instance, if the correction data is a mapping of measured PnO to estimated PnO, the mappings can be used to correct future measured PnO solutions based on the estimated PnO solutions correlated thereto. It should be understood that values indicative of PnO solutions may be additionally or alternatively stored, such as a mapping correlated PnO solutions by storing a vector. Alternatively, updating the correction data may involve updating variables of the correction algorithm, such as updating polynomial coefficients of a polynomial expression-based correction algorithm.

In some examples, updating of the correction vector may be conditioned on a determined level of confidence of the second PnO solution, whereby only reliable solutions are stored. For instance, the level of confidence determination routine 186 of FIG. 1 may be used to assess reliability of the best estimate PnO solutions, and determine whether the best estimate PnO solution is in fact reliable enough to confidently change the correction data in the database. The level of confidence may be quantified according to known reliability factors, and may be compared to a confidence threshold value to determine whether the estimated PnO solution meets (or exceeds) the confidence threshold for updating the correction data. Such a threshold prevents corruption of the correction data and correction algorithm with inaccurate feedback, so that bogus changes to the tracked environment are not recorded and future PnO determinations remain accurate.

The level of confidence may be determined based on changes in the determined PnO solutions over time. For example, large changes in a derived PnO solution, such as the estimated PnO solution, from one iteration of the routine to the next may indicate a lack of reliability in the PnO solution, since changes in a PnO solution between iterations are normally expected to be small and change slowly over time. Thus, the level of confidence may be inversely related to the degree of change of the PnO solution, whereby large changes correlate to low confidence, and result in avoidance of updating the correction data according to the determined PnO solutions. For further example, large changes to correction data from one iteration to the next may similarly indicate a lack of reliability in the PnO solution, since changes to correction data are reflective of changes to the tracked environment, and large changes to the tracked environment are normally expected to be gradual and not abrupt or instantaneous. Thus, large, abrupt changes in correction data may correlate to low confidence, and result in avoidance of updating the correction data according to the determined PnO solutions.

Additionally or alternatively, levels of confidence may be determined for each separate tracking subsystem. Reliability of both magnetic and non-magnetic PnO data may vary based on various factors. For a magnetic subsystem, reliability may be low in a tracking space that has high levels of distortion. Distortion may be a function of a distance between the transmitter coils and receiver coils, since the magnetic field may attenuate to some degree over a long enough distance. Distortion may additionally or alternatively be affected by the presence of distorting elements in the vicinity of the transmitter-receiver pair. It is also possible that increasing the distance between the transmitter circuit and receiver circuit will result in more distorting elements to be present between the transmitter-receiver pair, or for the receiver circuit to be closer to distorting elements than to the transmitter circuit. Accelerometer, gyroscope, and IMU data as a whole, may be prone to vibrations, as well as drift issues over a long enough span of time, such that reliability of the IMU PnO determination decreases as a duration of use and the magnitudes of changes from the last known good PnO increase. Example techniques for determining reliability of PnO solutions derived from magnetic and non-magnetic tracking systems are further described in commonly owned U.S. patent application Ser. No. 16/773,482, the disclosure of which is incorporated herein in its entirety by reference.

The routine 200 may further involve logging a PnO of the tracked object. Partially, the second PnO solution, which reflects the best estimate of the actual PnO of the object, may be logged. Logging the PnO may involve reporting the PnO to a user, or storing the PnO in a data log for future reference. In some applications, the PnO may further be evaluated to ensure proper operation of the system, such as ensuring that the tracked object does not leave a predefined area, or ensuring that other elements of the environment remain properly aligned with the tracked object.

As noted above, the example routine 200 of FIG. 2 may be performed on a regular or continuous basis, whereby operations of the routine 200 revert back to blocks 210 and 215 after updating the correction data according to block 240 (or, in some embodiments, avoiding updates based on low level of confidence). Thus, the position and orientation of the tracked object is constantly being tracked and corrected by the system, and the values used to correct the tracking are themselves subject to updates when necessary.

The example routine 200 of FIG. 2 is useful for both collecting information about an unknown tracking environment, as well as updating previously collected information about the tracking environment. In the case of collecting information about an unknown environment, the routine 200 may begin without any correction data having been previously collected. Then, through performance of the routine, distorting elements present in the environment are recognized, and correction data accounting for the distorting elements is stored for future operations. In the case of updating previously collected information, the routine 200 may begin with a complete set of correction data, but may recognize when distortion elements are added or removed from the tracking environment based on the derived PnO solutions. Thus, as distortion elements are added and removed from the tracking environment, the correction data may be updated to account for and compensate for those changes.

More particularly, it should be recognized that either or both the initial collecting of information and the updating of previously collected information can be performed without taking the system out of service. Stated another way, the system and routine are capable of recognizing and accounting for electromagnetic distortion changes in the tracking environment while the system is in service. This makes the system and routine disclosed herein especially advantageous for environments to which distortive elements are potentially introduced or removed during use of the environment.

The example routine 200 of FIG. 2 may be performed without a prior calibration phase for the system. In other words, the system may begin by collecting first and second PnO measurement data, deriving a best estimate of PnO based on the collected PnO measurement data, and storing the results. As the collected data builds up, the correction algorithm may become more precise, meaning that distortions in the tracking environment, and the resulting errors in measured PnO solutions using only the magnetic tracking subsystem, will effectively be mapped to a better estimated PnO.

Alternatively, the example routine 200 of FIG. 2 may be performed subsequent to a prior calibration phase. In the calibration phase, an initial mapping may be collected with the position and orientation relationship between the first and first objects being controlled by a non-magnetic calibration technology, such as a fixed mechanical structure. Data collected during the calibration phase may be included in the database, whereby PnO solution data collected subsequently during the routine 200 may be added to the calibration data to account for and compensate for changes in distortion that may not have been present during the calibration phase. In a similar vein, it should be recognized that calibration may be performed or re-performed at any time if a user wishes to do so, and the calibration data may all the same be included with, or replace, the PnO solution data in the database.

FURTHER EXAMPLES

The above examples generally describe systems and methods in which the receiver coils are mounted to a tracked object that freely moves about a tracking environment, so that the tracked object is tracked according to the frame of reference of the transmitter coils. However, due to the reciprocal nature of electromagnetic tracking systems, alternative configurations may involve affixing the transmitter coils to the tracked object, so that the tracked object is tracked according to the frame of reference of the receiver coils. In such cases, it may be preferable to place the active elements of the non-magnetic tracking device, such as the accelerometers and gyroscopes of an IMU, on the tracked object in locations that are fixed relative to the transmitter coils.

Additionally, the above examples generally describe systems and methods that transmit electrical signals from the receiver circuit to the computing devices for both the magnetic and non-magnetic tracking subsystems. However, other configurations are possible. For example, a non-magnetic active element may be included in the transmitter circuit, and data collected by the non-magnetic active element may be transmitted to the computing devices from the transmitter circuit. For further example, the non-magnetic tracking subsystem may include elements included in both the transmitter circuit and the receiver circuit, such as a respective transmitter and receiver for optical or acoustic signals. In yet further examples, the non-magnetic active elements may be separate from both the transmitter circuit and the receiver circuit, so long as the non-magnetic tracking subsystem maintains a known position and orientation relative to at least one of the transmitter circuit or the receiver circuit, or more particularly relative to the transmitter coils or the receiver coils.

Additionally, the above examples generally describe a system including a single type of non-magnetic active element, like an IMU. However, in other examples, the non-magnetic tracking subsystem may include multiple types of non-magnetic tracking devices. The devices may be kept together, such as all in the receiver circuit, or all in the transmitter circuit. Alternatively, the non-devices may be dispersed throughout the system, such as including non-magnetic active elements in the receiver circuit, or including some non-magnetic active elements in the transmitter circuit, or including some non-magnetic active elements separate from the transmitter and receiver but in a known position and orientation relative thereto, or any combination of the above. For non-magnetic active elements that utilize an optical sensor, a direct line of sight between the sensor and tracked object may be required, such that tracking is not possible if the tracked object becomes blocked, whereby a level of confidence in the optical sensor may be drop with loss of the direct line of sight. Similar considerations may be accounted for in acoustic devices, as well as GPS devices (such as for tracked objects moving above and below ground or in and out of buildings).

The above examples generally describe correcting a PnO solution derived from PnO measurement data from a magnetic tracking subsystem using PnO measurement data from a non-magnetic tracking subsystem. However, it should be recognized that a PnO solution derived from the non-magnetic tracking subsystem can similarly be corrected using PnO measurement data from the magnetic tracking subsystem. For instance, in the case of an IMU that is subject to errors due to drift, a drift correction can be applied to the IMU measurement data based on the magnetic tracking subsystem's measurement data. Such a correction may be applied particularly when PnO measurement data from the magnetic tracking subsystem is found to have a relatively high level of reliability and PnO measurement data from the IMU sensor (or in other examples, another sensor) is found to have a relatively low level of reliability. The drift correction or other feedback may help to improve future estimations by the system. Non-magnetic sensor data adjustment is described in greater detail in commonly owned U.S. patent application Ser. No. 16/773,482, the disclosure of which is incorporated herein in its entirety by reference The above examples generally describe a system for tracking the PnO of a tracked object. Such tracked objects may include but are not limited to a wearable or handheld object operated by a user, such as a helmet, a handheld surgical device, or a stylus. More generally, the methods and systems of the present disclosure may be applicable to, but are not limited to tracking the PnO of head mounted displays (HMD), handheld or wearable devices for surgical navigation (including simulations of surgical procedures), and handheld or wearable devices virtual reality or augmented reality programs.

The above examples generally describe a receiver circuit that includes an array of coils in order to detect the magnetic field generated by the transmitter circuit or circuits. However, in other examples, the receiver circuit may include sensing elements other than coils. For example, the receiver circuit may include one or more Hall effect sensing elements. It should be understood that the receiver coils of any of the above examples and embodiments may be replaced with the alternative receiver elements without changing the underlying nature of the systems and methods.

Although the present disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A method for tracking a position and orientation (PnO) of a first object within an environment according to a frame of reference defined by a second object, the method comprising repeatedly:
   deriving, by one or more processors, a measured PnO solution of the first object at a given position and orientation according to the frame of reference defined by the second object from first PnO measurement data received from a magnetic tracking subsystem, wherein deriving the measured and estimated PnO solutions includes:
      emitting, by a plurality of transmission coils of the magnetic tracking subsystem, magnetic fields along different respective axes of the transmission coils;
      sensing, by a plurality of sensing elements of the magnetic tracking subsystem, the emitted magnetic fields of each transmission coil along different respective axes of the sensing elements;
      receiving, by the one or more processors, first electrical signals indicative of the sensed magnetic fields; and
      determining, by the one or more processors, first PnO measurement data from the first electrical signals;
   for each derived measured PnO solution, deriving, by the one or more processors, a corresponding estimated PnO solution of the first object at the given position and orientation according to the frame of reference defined by the second object from a combination of adjusted first PnO measurement data and second PnO measurement data received from a non-magnetic tracking subsystem, wherein the adjusted first PnO measurement data is adjusted according to a correction algorithm that accounts for previously detected electromagnetic distortion within the environment based on previously stored correction data; and
   upon derivation of each of the derived measured PnO solution and the corresponding derived estimated PnO solution for the first object at the given position and orientation, updating, by the one or more processors, the previously stored correction data associated with the same given position and orientation based on the derived measured PnO solution and the derived estimated PnO solution.

2. The method of claim 1, further comprising, for each derived estimated PnO solution, logging the estimated PnO solution in a log or outputting the estimated PnO solution to a user.

3. The method of claim 1, wherein the method is repeatedly performed while the first object is in use.

4. The method of claim 1, wherein the method is repeatedly performed while the first object is freely moving about the environment.

5. The method of claim 1, further comprising determining, by the one or more processors, a level of confidence in the estimated PnO solution, wherein updating the previously stored correction data is performed in response to the level of confidence in the estimated PnO solution meeting or exceeding a threshold confidence value.

6. The method of claim 5, wherein determining the level of confidence comprises determining, by the one or more processors, a respective quality factor for each of the magnetic tracking subsystem and the non-magnetic tracking subsystem, and wherein the level of confidence is determined based on a combination of the respective quality factors.

7. The method of claim 6, further comprising, in response to determining the magnetic tracking subsystem to be reliable and the non-magnetic tracking subsystem to be unreliable based on the respective quality factors, adjusting, by the one or more processors, the second PnO measurement data to correct an error in the second PnO measurement data.

8. The method of claim 5, wherein the level of confidence is based at least in part on a change in the estimated PnO solution, or a change to the correction data, over time.

9. The method of claim 1, further comprising a calibration phase performed prior to the method, wherein during the calibration phase, deriving first and second PnO solutions, and updating the correction data, are performed while a PnO of the first object relative to the second object is controlled by a fixed mechanical structure, wherein the correction data is based at least partially on first and second PnO solutions derived during the calibration phase.

10. The method of claim 9, wherein the correction data includes both (i) first and second PnO solutions determined during the calibration phase and (ii) first and second PnO solutions determined while the first object is freely moving about the environment.

11. The method of claim 1, wherein the method is performed as one or more elements creating electromagnetic distortion within the environment is introduced or removed from the environment.

12. A system for tracking a freely moving first object relative to a second object, comprising:
   a magnetic tracking subsystem including a first set of active elements including a plurality of transmission coils having different axes and a second set of active elements including a plurality of sensing elements operative to detect magnetic fields emitted by the plurality of transmission coils along different axes and to generate corresponding electrical signals for each component of the magnetic field;
   a non-magnetic tracking subsystem including at least one tracking element having a known position and orientation relative to at least one of the plurality of transmission coils or the plurality of sensing elements; and
   one or more processors configured to:
   derive first position and orientation (PnO) measurement data of the freely moving first object at a given position and orientation from the electrical signals received from the plurality of sensing elements of the magnetic tracking subsystem;
   for each PnO solution derived in the first PnO measurement data:
      derive second PnO measurement data of the freely moving first object at the given position and orientation from the non-magnetic tracking subsystem;
      determine a first PnO solution of the freely moving first object relative to the second object based on the first PnO measurement data and irrespective of the second PnO measurement data;
      determine a second PnO solution of the first object relative to the second based on (i) the first PnO measurement data adjusted according to correction data applied by a correction algorithm and (ii) the second PnO measurement data; and upon determination of each of the first PnO solution and the second PnO solution of the freely moving first object at the given position and orientation, update the correction data associated with the same given position and orientation based on the derived first and second PnO solutions.

13. The system of claim 12, further comprising a memory, wherein the correction data is stored in the memory, and wherein the one or more processors are configured to:

access the correction data from the memory; and adjust the first PnO measurement data according to the accessed correction data.

14. The system of claim 12, wherein the one or more processors are configured to repeatedly derive first and second PnO measurement data, determine first and second PnO solutions, and update the correction data while the system is in service.

15. The system of claim 12, wherein the one or more processors are further configured to:

determine a level of confidence of the second PnO solution;

update the correction data in response to the determined level of confidence meeting or exceeding a threshold confidence value; and avoid updating the correction data in response to the determined level of confidence not meeting or exceeding the threshold confidence value.

16. The system of claim 15, wherein the one or more processors are further configured to determine a respective quality factor for each of the magnetic tracking subsystem and the non-magnetic tracking subsystem, wherein the level of confidence is based on a combination of the respective quality factors.

17. The system of claim 15, wherein the level of confidence is based at least in part on a change in the second PnO solution, or a change to the correction data, over time.

18. The system according to claim 12, wherein the at least one tracking element of the non-magnetic tracking subsystem is an inertial sensor, an optical transmitter or sensor, an acoustic transmitter or sensor, a radio frequency (RF) transmitter or sensor, a global positioning system (GPS) receiver, or a radar chip.

19. The system according to claim 12, wherein at least one active element of the non-magnetic tracking subsystem is mechanically coupled to the transmission coils or the sensing elements of the magnetic tracking subsystem.

20. The system according to claim 12, wherein the correction data is indicative of previously detected electromagnetic distortions, and wherein correction algorithm corrects the first PnO solution to counteract errors manifested by the previously detected electromagnetic distortions.

* * * * *